United States Patent [19]

Ishizaka

[11] 4,187,016
[45] Feb. 5, 1980

[54] VIEWFINDER FOCUSING SCREEN SUPPORTING APPARATUS FOR SINGLE-LENS REFLEX CAMERA

[75] Inventor: Sunao Ishizaka, Tokyo, Japan

[73] Assignee: Nippon Kogaku K.K., Tokyo, Japan

[21] Appl. No.: 934,211

[22] Filed: Aug. 16, 1978

[30] Foreign Application Priority Data

Aug. 17, 1977 [JP] Japan .................. 52/109154[U]

[51] Int. Cl.² ............... G03B 13/00; G03B 19/12
[52] U.S. Cl. ............................ 354/152; 354/155; 354/200
[58] Field of Search ............ 354/152, 155, 188, 200, 354/201, 219, 225

[56] References Cited

U.S. PATENT DOCUMENTS

| | | | |
|---|---|---|---|
| 1,153,393 | 9/1915 | Kajiwara | 354/200 |
| 2,981,166 | 4/1961 | Madge | 354/200 |
| 3,174,417 | 3/1965 | Saver et al. | 354/155 |

*Primary Examiner*—L. T. Hix
*Assistant Examiner*—Thomas H. Tarcza
*Attorney, Agent, or Firm*—Fitzpatrick, Cella, Harper & Scinto

[57] ABSTRACT

A finder screen-supporting apparatus for a single-lens reflex camera with an interchangeable focusing screen, comprises a screen support frame attachable to the camera body and directly supporting the focusing screen by four ends thereof, and a spring member pressing the focusing screen to the focal position and fixing said screen in said position upon attaching said frame to said camera body.

2 Claims, 5 Drawing Figures

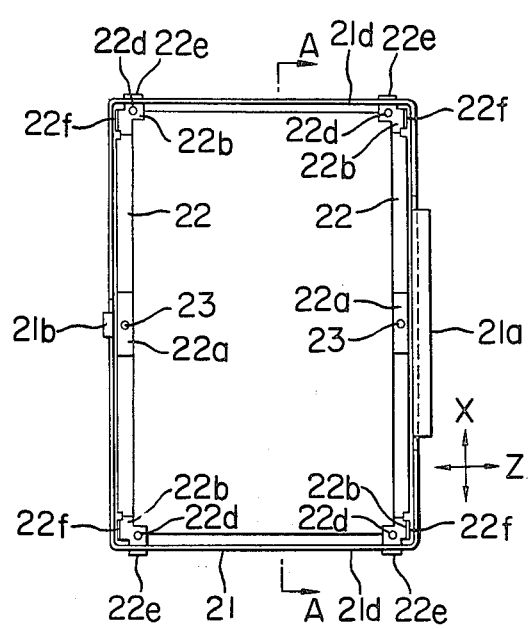
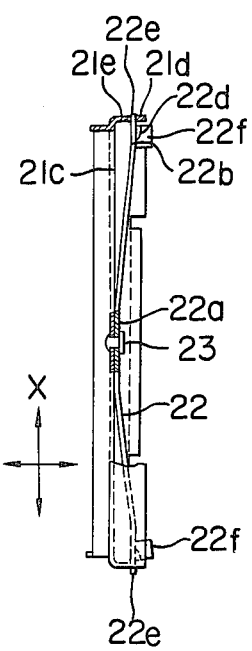
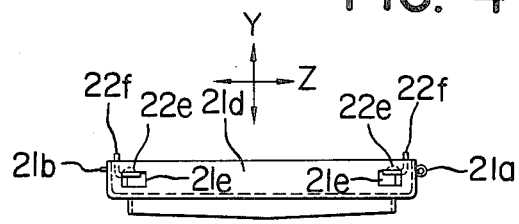
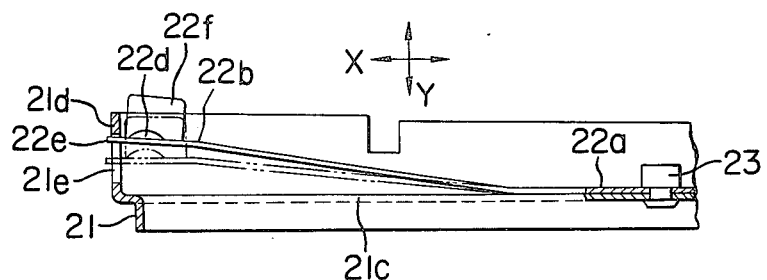

VIEWFINDER FOCUSING SCREEN SUPPORTING APPARATUS FOR SINGLE-LENS REFLEX CAMERA

BACKGROUND OF THE INVENTION

1. Field of the Invention

The present invention relates to a focusing screen supporting apparatus with an interchangeable focusing screen provided between the mirror and pentaroof prism of a single-lens reflex camera.

2. Description of the Prior Art

The focusing screen supporting apparatus known in the prior art is composed of a rotatable frame mounted to the camera body so as to be rotatable about a side of said frame, spring members respectively provided on mutually facing sides of said frame and a focusing screen supporting member supported on said rotatable frame by means of said spring members, and is structured to press the focusing screen to the focal position and fixing said screen in said position by means of the resilient force of said spring members provided between said rotatable frame and said screen support member when the rotatable frame is fixed in a horizontal position with the focusing screen placed on said support member.

However, such apparatus, requiring said support member for supporting the focusing screen and separate spring members for pressing the focusing screen against the focal position, is disadvantageous in requiring a number of component parts.

SUMMARY OF THE INVENTION

Thus the object of the present invention is to provide a focusing screen supporting apparatus with a reduced number of component parts.

BRIEF DESCRIPTION OF THE DRAWINGS

FIG. 2 is an elevation view of the focusing screen supporting apparatus shown in FIG. 1;

FIG. 3 is a cross-sectional view along the line A—A in FIG. 2;

FIG. 4 is a lateral view of the apparatus shown in FIG. 2; and

FIG. 5 is a partial enlarged cross-section view of the apparatus shown in FIG. 2.

DESCRIPTION OF THE PREFERRED EMBODIMENT

Figure 1:
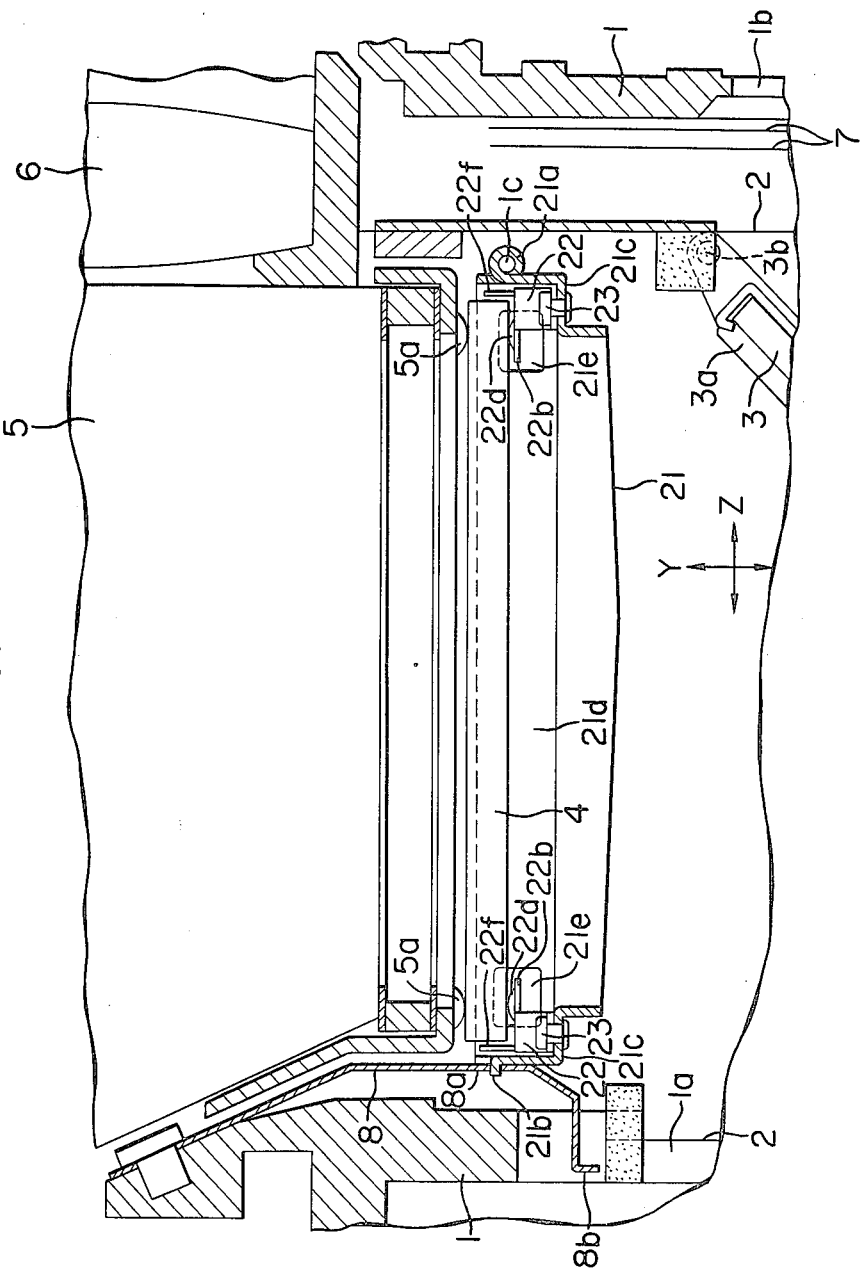
FIG. 1 is an enlarged cross-sectional view of the focusing screen supporting apparatus of the present invention applied to a single-lens reflex camera.

Now the present invention will be explained in detail with particular reference to an embodiment thereof illustrated in the attached drawings. In FIG. 1 which is an enlarged cross-section view of the focusing screen supporting apparatus of the present invention mounted in a single-lens reflex camera, there are shown a camera body 1, an outer contour of a mirror box 2, a mirror 3, a viewfinder screen or focusing screen 4, a pentaroof prism 5, an eyepiece lens 6 and shutter curtains 7, which are of structures already known in the art. Thus, in viewing an object to be photographed, the light coming through an imaging lens (not shown) and a front opening 1a of the camera body is guided through said mirror 3, focusing screen 4 and pentaroof prism 5 to the eyepiece lens 6. When the shutter is released, the mirror 3 is retracted from the optical path by clockwise rotation of a mirror frame 3a supporting said mirror 3 about a rotational shaft 3b, so that the light from said object coming through said front opening 1a of the camera body is guided to an unrepresented photographic film through an aperture 1b formed by the displacement of shutter curtains 7.

The focusing screen supporting apparatus of the present invention is provided between said mirror 3 and the pentaroof prism 5. In the following there will be given a detailed description on said focusing screen supporting apparatus while referring to aforementioned FIG. 1, an elevation view shown in FIG. 2, a cross-sectional view along the line A—A therein shown in FIG. 3, a lateral view shown in FIG. 4 and a partial enlarged cross-sectional view shown in FIG. 5. Referring to these drawings, a focusing screen support frame 21 is provided on one side thereof with an annular member 21a encircling a shaft 1c mounted on the camera body, and on an opposite side thereof with a projecting member 21b for engaging with an opening 8a of a lock spring 8 mounted at an end thereof on the camera body. There are provided press springs 22 on shoulder portions 21c of the mutually opposite sides of said focusing screen support frame 21. As shown in FIGS. 2 and 3, said press springs 22 are shaped upwardly arcuate and fixed in the center portion 22a thereof to said shoulder portions 21c by means of caulking pins 23. Said press springs 22 are provided, at the end portions 22b thereof, with semispherical projections 22d for supporting the focal plate 4 thereon, the ends 22e of said press springs being inserted into openings 21e formed on the side walls 21d of the focusing screen support frame. Further, said end portions 22b are provided, at one side thereof, with vertically extended projections 22f to prevent displacement of the focusing screen 4 in the Z-direction (see FIGS. 2 and 4). On the other hand the walls 21d of the support frame 21 having said openings 21e are so structured as to prevent displacement of the focusing screen 4 in the X-direction (see FIGS. 2, 3 and 5).

Now the function of the apparatus of the present invention will be explained in the following. When a free end 8b of the lock spring 8, in the state shown in FIG. 1 is pulled leftwards through the front opening 1a of the camera body, the projecting portion 21b of the support frame 21 is released from the opening 8a of said lock spring 8, so that the support frame 21 and the focusing screen 4 integrally rotate counter clockwise by their own weights about the shaft 1c until the lower face of said support frame 21 comes in abutment with the upper face of the mirror frame 3a. In this state, therefore, it is rendered possible to replace the focusing screen with an another focusing screen. Upon removal of said screen 4, the ends 22e of said press springs 22 are in pressure contact with the upper sides of said openings 21e by the resilient force of said springs (see FIGS. 3 to 5).

Another focusing screen 4 placed on four semispherical projections 22d is prevented from moving in the Z- and X-direction by the vertically extended portions 22f of said press springs and the wall portions 21d of the support frame, respectively. Upon upward displacement of the front end of the support frame 21, the focusing screen 4 at first comes into contact with projections 5a provided under said pentaroof prism 5 defining a base plane. Upon further pushing of the front side of the support frame 21, the focusing screen 4, while maintained in contact with said projections 5a, presses the press springs 22 against the resilient force thereof. Thus the ends 22e of said press springs pressing the focusing screen upwards leave the upper sides of said openings 21e and displace to a position between the upper and lower sides thereof, as represented by double-dotted broken line in FIG. 5. Simultaneously the projecting portion 21b of the support frame 21 displaces the lock spring 8 to the left in FIG. 1 against the resilient force thereof, becomes opposed to the opening 8a therof when the ends 22e of said press springs has left the upper ends of said openings 21e as explained in the foregoing, and then engages the opening 8a by the resilient force of the spring 8. In this manner the focusing screen support frame 21 is locked in a horizontal positioned and maintained in this state unless the free end 8b of the lock spring 8 is moved leftwards. Also the end portions 22b of the press spring 22, the movement thereof being not confined by the upper sides of the openings 21e, press the focusing screen 4 by means of the semi-spherical projections 22d against the projections 5a of pentaroof prism defining the base plane, thus fixing the focusing screen in the focal position. Stated differently the focusing screen 4 is prevented from displacement in the Y-direction.

As detailedly explained in the foregoing, the present invention, wherein said press springs are utilized for supporting the viewfinder focusing screen and also for pressing said focusing against the focal position, allows to obtain a focusing screen supporting apparatus of a simpler structure with a reduced number of component parts.

What is claimed is:

1. A viewfinder focusing screen supporting apparatus for a single-lens reflex camera comprising:
    (a) a focusing screen support frame provided with resilient support means for resiliently supporting a viewfinder focusing screen, said support frame being rotatable in the body of said camera so as to allow replacement of said focusing screen through the front opening of the camera body;
    (b) positioning means provided under a pentaroof prism; and
    (c) engaging means provided on said support frame and said camera body for mutual integral engagement of the two, said engaging means being adapted to press said focusing screen against said positioning means and fix said focusing screen in this position upon engagement of said support frame with said camera body by said engaging means, wherein said focusing screen support frame is composed of four side walls adapted to surround the periphery of said focusing screen, shoulder portions extending inwardly from said side walls, and an opening provided in the vicinity of each end of two mutually facing walls of said four side walls and above said shoulder portions; and said resilient means is composed of two arcuate spring members of a projected length somewhat larger than the length of said side walls not provided with said openings, said spring members being secured approximately at the center portions thereof to said shoulder portions of said side walls not provided with said openings, said spring members being adapted for insertion at the end portions thereof into said openings and maintained in pressure contact with the upper sides of said openings by the resilient force of said spring members when said focusing screen is positioned against said positioning means.

2. Apparatus according to claim 1, wherein the extremities of said spring members are formed with upstanding projections positioned relative to the respective adjacent side wall to prevent lateral movement of said screen in a direction perpendicular to the direction of the length of said spring members.

* * * * *

UNITED STATES PATENT AND TRADEMARK OFFICE
CERTIFICATE OF CORRECTION

PATENT NO. : 4,187,016
DATED : February 5, 1980
INVENTOR(S) : SUNAO ISHIZAKA

It is certified that error appears in the above-identified patent and that said Letters Patent are hereby corrected as shown below:

Column 2, line 65, after "5" insert --for--;

Column 2, line 66, after "further" insert --upward--.

Column 3, line 9, change "therof" to --thereof--.

Signed and Sealed this

First Day of July 1980

[SEAL]

Attest:

SIDNEY A. DIAMOND

Attesting Officer

Commissioner of Patents and Trademarks